(12) United States Patent
Lin

(10) Patent No.: US 8,547,696 B2
(45) Date of Patent: Oct. 1, 2013

(54) LATCH MODULE AND ELECTRONIC DEVICE USING THE SAME

(75) Inventor: Yun-Tang Lin, Taipei (TW)

(73) Assignee: Inventec Corporation, Taipei (TW)

( * ) Notice: Subject to any disclaimer, the term of this patent is extended or adjusted under 35 U.S.C. 154(b) by 357 days.

(21) Appl. No.: 13/161,304

(22) Filed: Jun. 15, 2011

(65) Prior Publication Data
US 2012/0250230 A1     Oct. 4, 2012

(30) Foreign Application Priority Data
Mar. 31, 2011   (TW) .............................. 100111318 A

(51) Int. Cl.
*H05K 5/00*      (2006.01)
*A47B 81/00*     (2006.01)

(52) U.S. Cl.
USPC ............ 361/679.58; 361/679.57; 361/679.43; 361/679; 361/27; 312/223.2

(58) Field of Classification Search
USPC ............... 361/679.01–679.07, 679.4–679.45, 361/679.57–679.59, 726–727, 732, 740–747, 361/759; 312/223.1, 223.2, 223.3
See application file for complete search history.

(56) References Cited

U.S. PATENT DOCUMENTS
7,495,896 B2 *   2/2009   Chen et al. ............... 361/679.27

FOREIGN PATENT DOCUMENTS
TW   097125934   7/2008
TW   M391257    10/2010

* cited by examiner

Primary Examiner — Jayprakash N Gandhi
Assistant Examiner — Jerry Wu
(74) Attorney, Agent, or Firm — CKC & Partners Co., Ltd.

(57) ABSTRACT

A latch module and an electronic device using the same are provided. The electronic device includes the latch module as well as first and second bodies that are opened and closed relative to each other. The latch module in the first body includes a pressing member, a linking member, and a latch. The pressing member is movably configured in and passes through the first body along a first axis. The linking member is pivoted to the first body. The pressing member leans against the linking member. The latch is configured in the first body along a second axis. The linking member leans against the latch. The pressing member moves relative to the first body along the first axis to press and rotate the linking member relative to the first body. Thus, the linking member presses the latch to move relative to the first body along the second axis.

8 Claims, 3 Drawing Sheets

LATCH MODULE AND ELECTRONIC DEVICE USING THE SAME

CROSS-REFERENCE TO RELATED APPLICATION

This application claims the priority benefit of Taiwan application serial no. 100111318, filed on Mar. 31, 2011. The entirety of the above-mentioned patent application is hereby incorporated by reference herein and made a part of this specification.

BACKGROUND OF THE INVENTION

1. Field of the Invention

The invention relates to a latch module. More particularly, the invention relates to a latch module used for latching a body of an electronic device.

2. Description of Related Art

With continuous development of science and technology as well as advancement of manufacturing technology, products are not only required to perform multiple functions and have favorable quality but also required to be miniaturized and portable. Particularly, in order to comply with consumers' requirement, manufacturers of notebook computers strive to miniaturize the notebook computers by physically reducing the volume of electronic components within the notebook computers on the condition that the functions of these components are increased or at least not changed. This often leads to an increase in time consumption, labor costs, and other expenses.

In a conventional notebook computer, an latch module, for instance, is used to lock the body when the notebook computer is closed. In order to smooth the action of locking or unlocking, a number of individual parts are required to be configured in the conventional latch device, and additional costs are spent on designing a mold for producing each part. Additional time of assembling the individual parts is required as well. Moreover, due to the requirement for compactness of the notebook computer, the internal space of the body of the notebook computer is reduced. Since the internal space of the body is reduced, relevant parts of the latch module configured in the body need to have compact size. As a result, fabrication and assembly of the parts are even more difficult.

SUMMARY OF THE INVENTION

The invention is directed to an electronic device in which a latch module has simple components.

In an embodiment of the invention, a latch module adapted to an electronic device is provided. The electronic device has a first body and a second body that are opened and closed relative to each other. The latch module is configured in the first body and latches the second body when the first body is closed relative to the second body. The latch module includes a pressing member, a linking member, and a latch. The pressing member is movably configured in and passes through the first body along a first axis. The linking member is pivoted to the first body, and the pressing member leans against the linking member. The latch is movably configured in the first body along a second axis, and the linking member leans against the latch. The pressing member moves relative to the first body along the first axis to press the linking member, so as to rotate the linking member relative to the first body. Thus, the linking member presses the latch to move relative to the first body along the second axis.

In an embodiment of the invention, an electronic device that includes a first body, a second body, and a latch module is provided. The second body is assembled to the first body and is opened and closed relative to the first body. The latch module is configured in the first body and includes a pressing member, a linking member, and a latch. The pressing member is movably configured in and passes through the first body along a first axis. The linking member is pivoted to the first body, and the pressing member leans against the linking member. The latch is configured in the first body along a second axis, and the linking member leans against the latch. The pressing member moves relative to the first body along the first axis to press the linking member, so as to rotate the linking member relative to the first body. Thus, the linking member presses the latch to move relative to the first body along the second axis.

According to an embodiment of the invention, the linking member has a body, a first linking portion, and a second linking portion. The first and second linking portions are located at two opposite sides of the body. The body is pivoted to the first body, such that the first and second linking portions rotate relative to the first body. The pressing member leans against the first linking portion, and the second linking portion leans against the latch.

According to an embodiment of the invention, the linking member is an L-shaped member. The body is located in the corner of the L-shaped member. A length of the first linking member is shorter than a length of the second linking member. Parts of the first linking portion which are in contact with the pressing member have a rotating course, and parts of the second linking portion which are in contact with the latch have a rotating course. When the linking member rotates, the rotating course of the parts of the first linking portion in contact with the pressing member is shorter than the rotating course of the parts of the second linking portion in contact with the latch.

According to an embodiment of the invention, a rotating course of the latch relative to the first body is longer than a rotating course of the pressing member relative to the first body.

According to an embodiment of the invention, the pressing member has a first leaning portion, and the latch includes a rod, a second leaning portion, and at least one locking hook. The rod is slidably configured in the first body along the second axis. The second leaning portion is configured on the rod and leans against the second linking portion. The first leaning portion pushes the first linking portion forward, such that the second linking portion pushes the second leaning portion forward. The locking hook is configured on the rod and protrudes from the first body.

As described in the embodiments of the invention, the latch module configured in the bodies of the electronic device is applied to latch or release the bodies. Besides, the structure of the latch module is rather simple, i.e., the latch module includes moving and rotating members to transfer the force exerted by a user to the latch. Thereby, the bodies can be easily latched or released, and the action of latching or releasing can be smoothly performed. As such, the electronic device can be developed toward the trend of compactness and miniaturization.

Other features and advantages of the invention will be further understood from the further technological features disclosed by the embodiments of the invention wherein there are shown and described embodiments of this invention, simply by way of illustration of best modes to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
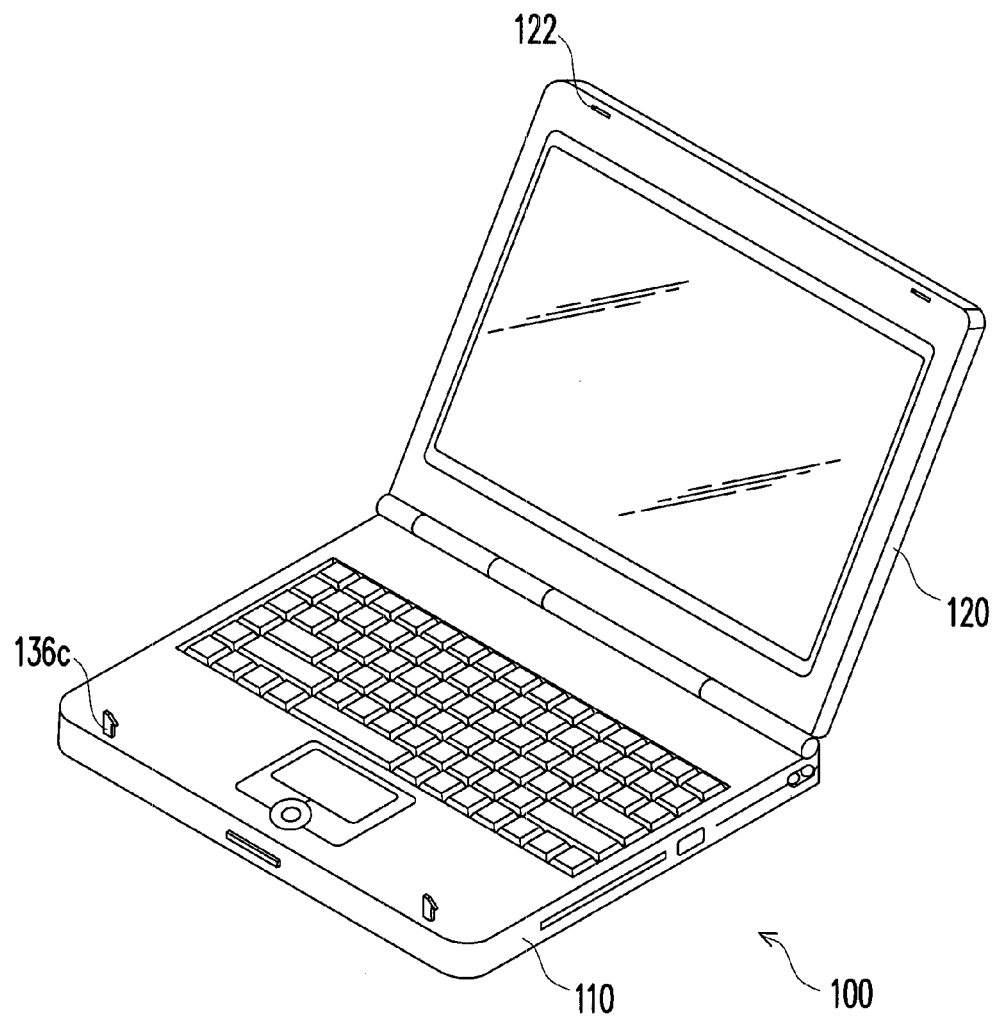
FIG. 1 is a schematic view illustrating an electronic device according to an embodiment of the invention.
Figure 2:
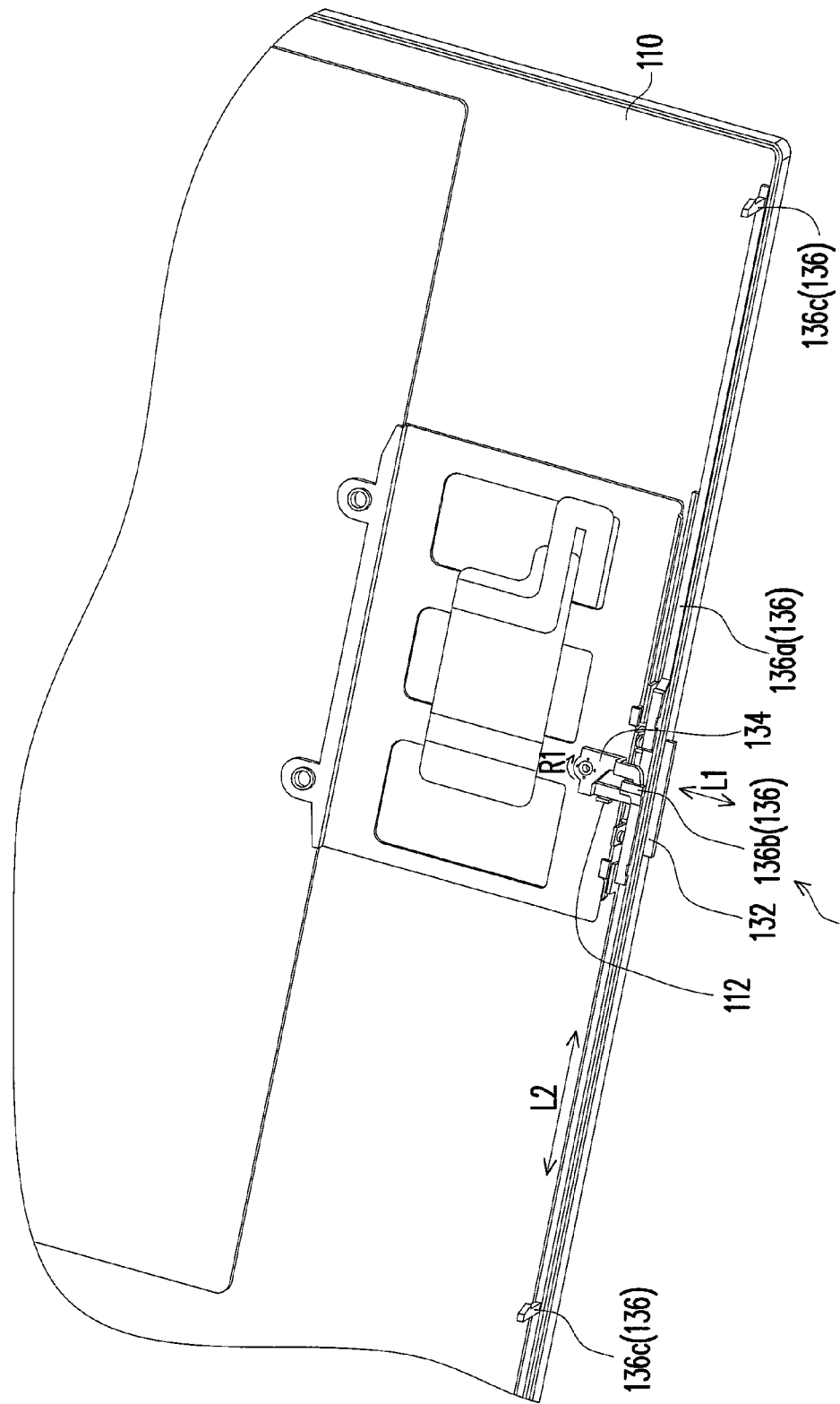
FIG. 2 is a schematic view illustrating a portion of the electronic device depicted in FIG. 1 after the housing of the electronic device is partially removed.

FIG. 1 is a schematic view illustrating an electronic device according to an embodiment of the invention. FIG. 2 is a schematic view illustrating a portion of the electronic device depicted in FIG. 1 after the housing of the electronic device is partially removed. With reference to FIG. 1 and FIG. 2, in this embodiment, the electronic device 100 is a notebook computer that includes a first body 110 (e.g., a host), a second body 120 (e.g., a screen), and a latch module 130. The first and second bodies 110 and 120 can be opened and closed relative to each other. The latch module 130 is configured in the first body 110, and parts of the latch module 130 pass through and protrude from the first body 110, such that a user can operate the latch module 130 to lock the first and second bodies 110 and 120. Alternatively, the user can operate the latch module 130 to unlock the first and second bodies 110 and 120, such that the electronic device 100 can be unfolded (i.e., in an open state).

Figure 3:
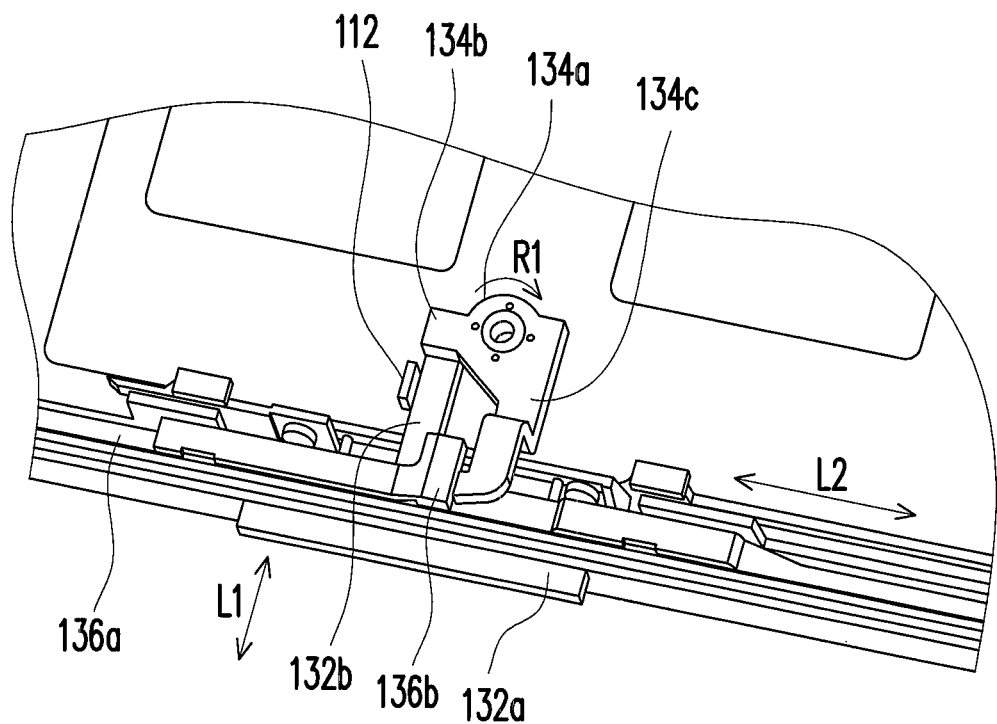
FIG. 3 is a partially enlarged view of the electronic device depicted in FIG. 2.

FIG. 3 is a partially enlarged view of the electronic device depicted in FIG. 2. With reference to FIG. 1 to FIG. 3, in this embodiment, the latch module 130 includes a pressing member 132, a linking member 134, and a latch 136 that lean against one another. The pressing member 132 is movably configured in and passes through the first body 110 along a first axis L1. The linking member 134 is pivoted to the first body 110 and rotates relative to the first body 110 in a rotation direction R1. The latch 136 is movably configured in the first body 110 along a second axis L2, and the latch 136 partially protrudes from the first body 110 to latch the second body 120. The linking member 134 leans between the pressing member 132 and the latch 136.

Hence, when a user exerts a force on the pressing member 132 to move the pressing member 132 along the first axis L1, the pressing member 132 rotates the linking member 134 relative to the first body 110 in the rotation direction R1. The rotating linking member 134 moves the latch 136 along the second axis L2, and finally the latch 136 latches or releases the second body 120. In this embodiment, the first axis L1 is substantially perpendicular to the second axis L2, which should not be construed as a limitation to the invention. Any transmission structure including members that can be moved along different axes that are not parallel to each other is applicable in this invention.

Based on the above, the rotatable linking member 134 in the latch module 130 of this embodiment is configured between the pressing member 132 and the latch 136 that are linearly moved, such that the axis along which the pressing member 132 is moved (i.e., the direction in which the user exerts the force on the pressing member 132) can be changed to the axis along which the latch 136 is moved. That is to say, with the simple components, the latch module 130 can easily move to lock or unlock the first and second bodies 110 and 120. According to the related art, a number of components are required for performing the action of locking or unlocking. By contrast, in the invention as described in the embodiments, less components are required for said action. Thereby, costs can be reduced, and satisfactory movement efficiency can be achieved.

As described below, the pressing member 132 moves the linking member 134 and the latch 136, such that the latch module 130 can release the second body 120. However, the invention is not limited thereto. Namely, the corresponding movement of said components also allows the latch module 130 to lock the second body 120.

With reference to FIG. 2 and FIG. 3, specifically, the pressing member 132 has a pressing portion 132a and a first leaning portion 132b. The pressing portion 132a protrudes from the first body 110, and the first leaning portion 132b is located in the first body 110. An orthographic projection area of the first leaning portion 132b on a normal plane of the first axis L1 is greater than an orthographic projection area of the pressing portion 132a on said plane. That is to say, the pressing portion 132a protruding from the first body 110 has a cross-sectional area, the first leaning portion 132b that is configured in the first body 110 and leans against the linking member 134 has a cross-sectional area, and said cross-sectional area of the pressing portion 132a is greater than a cross-sectional area of the first leaning portion 132b. As such, the user can easily and conveniently exert the force on the pressing member 132a to move the first leaning portion 132b. In order to press the pressing portion 132a and then allow the first leaning portion 132b to smoothly move the linking member 134 along the first axis L1, the first body 110 has a guiding portion 112 extended along the first axis L1. Thereby, the first leaning portion 132b can move relative to the first body 110 along the guiding portion 112, so as to prevent the pressing portion 132a and the first leaning portion 132b from being deviated during movement.

Moreover, the linking member 134 has a body 134a, a first linking portion 134b, and a second linking portion 134c. The first linking portion 134b and the second linking portion 134c are located at two opposite sides of the body 134a. The body 134a is pivoted to the first body 110, such that the first and second linking portions 134b and 134c rotate relative to the first body 110. The first leaning portion 132b of the pressing member 132 leans against the first linking portion 134b. When the first leaning portion 132b moves along the first axis L1, the first linking portion 134b can be driven to rotate relative to the first body 110 in the rotation direction R1.

The latch 136 includes a rod 136a and a second leaning portion 136b. The rod 136a is slidably configured in the first body 110 along the second axis L2. The second leaning portion 136b is fixed to the rod 136a and leans against the second linking portion 134c of the linking member 134. It should be mentioned that the linking member 134 is substantially an L-shaped member, and the body 134a is located in the corner of the L-shaped member. The first linking portion 134b and the second linking portion 134c are two arms extending from the body 134a toward different directions. Therefore, in the linking member 134 which rotates in the rotation direction R1, the second linking portion 134c drives the second leaning portion 136b and the rod 136a to move along the second axis L2. As a result, said components 132, 134, and 136 in the latch module 130 can be moved along two different axes L1 and L2.

The first and second linking portions 134b and 134c are respectively located on two different planes. Namely, the pressing member 132 and the first linking portion 134b are located on the same plane, and the latch 136 and the second linking portion 134c are located on the same plane according to this embodiment. Here, the two different planes are in different distances from the bottom of the first body 110. Thereby, the pressing member 132 and the latch 136 that move along different axes can be simultaneously coupled to the linking member 134 and can be misaligned to each other. As such, the volume of the latch module 130 in the first body 110 can be effectively reduced.

With reference to FIG. 1 and FIG. 2, the latch 136 has a pair of locking hooks 136c fixed to two opposite sides of the rod 136a, and the locking hooks 136c protrude from the first body 110. The second body 120 has a pair of locking holes 122 corresponding to the pair of locking hooks 136c. Here, the locking hooks 136c, together with the rod 136a, slide relative to the first body 110 and are locked to or released from the locking holes 122, so as to latch or release the second body 120.

According to this embodiment, the length of the first linking portion 134b is shorter than the length of the second linking portion 134c. Therefore, the moving course of the latch 136 relative to the first body 110 is longer than the moving course of the pressing member 132 relative to the first body 110. That is to say, the user pushes the pressing member 132 for a relatively short distance, and the latch 136 can be moved for a relatively long distance. Namely, even though a relatively small force is exerted on the latch module 130, the latch module 130 can latch or release the second body 120. Thus, the operation is more effortless for the user.

As described in the embodiments of the invention, the latch module configured in the bodies of the electronic device is applied to latch or release the bodies. Besides, the structure of the latch module is rather simple, i.e., the latch module includes moving and rotating members to transfer the force exerted by a user to the latch. Thereby, the bodies can be easily latched or released, and the action of latching or releasing can be smoothly performed. As such, the electronic device can be developed toward the trend of compactness and miniaturization.

Although the invention has been described with reference to the above embodiments, it will be apparent to one of the ordinary skill in the art that modifications to the described embodiments may be made without departing from the spirit of the invention. Accordingly, the scope of the invention will be defined by the attached claims rather than by the above detailed descriptions.

What is claimed is:

1. A latch module adapted to an electronic device, the electronic device having a first body and a second body, the first and second bodies being opened and closed relative to each other, the latch module being configured in the first body, the latch module latching the second body when the first body is closed relative to the second body, the latch module comprising:
   a pressing member movably configured in and passing through the first body along a first axis; a linking member pivoted to the first body, the pressing member leaning against the linking member; and a latch configured in the first body along a second axis perpendicular to the first axis, the linking member leaning against the latch, the pressing member moving relative to the first body along the first axis to press the linking member and rotate the linking member relative to the first body, such that the linking member drives the latch to move relative to the first body along the second axis; and
   the linking member being an L-shaped with a body, a first linking portion, and a second linking portion, the first and second linking portions being located at two opposite sides of the body, the body being pivoted to the first body, such that the first and second linking portions rotate relative to the first body, the pressing member leaning against the first linking portion, the second linking portion leaning against the latch; and
   the body being located in a corner of the L-shaped member, a length of the first linking member being shorter than a length of the second linking member.

2. The latch module as recited in claim 1, wherein a rotating course of the latch relative to the first body is longer than a rotating course of the pressing member relative to the first body.

3. The latch module as recited in claim 1 parts of the first linking portion in contact with the pressing member having a rotating course, parts of the second linking portion in contact with the latch having a rotating course, wherein when the linking member rotates, the rotating course of the parts of the first linking portion in contact with the pressing member is shorter than the rotating course of the parts of the second linking portion in contact with the latch.

4. The latch module as recited in claim 1, wherein the pressing member has a first leaning portion, and the latch comprises:
   a rod slidably configured in the first body along the second axis;
   a second leaning portion configured on the rod and leaning against the second linking portion, wherein the first leaning portion pushes the first linking portion forward, such that the second linking portion pushes the second leaning portion forward; and
   at least one locking hook configured on the rod and protruding from the first body.

5. An electronic device comprising: a first body; a second body assembled to the first body, the second body being opened and closed relative to the first body; a latch module configured in the first body and comprising: a pressing member movably configured in and passing through the first body along a first axis; a linking member pivoted to the first body, the pressing member leaning against the linking member; a latch configured in the first body along a second axis perpendicular to the first axis, the linking member leaning against the latch, the pressing member pressing the linking member relative to the first body along the first axis to rotate the linking member relative to the first body, such that the linking member drives the latch to move relative to the first body along the second axis; and
   the linking member being an L-shaped with a body, a first linking portion, and a second linking portion, the first and second linking portions being located at two opposite sides of the body, the body being pivoted to the first body, such that the first and second linking portions rotate relative to the first body, the pressing member leaning against the first linking portion, the second linking portion leaning against the latch; and
   the body being located in a corner of the L-shaped member, a length of the first linking member being shorter than a length of the second linking member.

6. The electronic device as recited in claim 5, wherein a rotating course of the latch relative to the first body is longer than a rotating course of the pressing member relative to the first body.

7. The electronic device as recited in claim 5, parts of the first linking portion in contact with the pressing member having a rotating course, parts of the second linking portion in contact with the latch having a rotating course, wherein when the linking member rotates, the rotating course of the parts of the first linking portion in contact with the pressing member is shorter than the rotating course of the parts of the second linking portion in contact with the latch.

8. The electronic device as recited in claim 5, wherein the pressing member has a first leaning portion, and the latch comprises:
- a rod slidably configured in the first body along the second axis;
- a second leaning portion configured on the rod and leaning against the second linking portion, wherein the first leaning portion pushes the first linking portion forward, such that the second linking portion pushes the second leaning portion forward; and
- at least one locking hook configured on the rod and protruding from the first body.

* * * * *